(12) United States Patent
Restivo

(10) Patent No.: US 9,705,550 B2
(45) Date of Patent: Jul. 11, 2017

(54) ELECTRONIC DEVICE COVER

(71) Applicant: Keith Richard Restivo, Waterbury, CT (US)

(72) Inventor: Keith Richard Restivo, Waterbury, CT (US)

(*) Notice: Subject to any disclaimer, the term of this patent is extended or adjusted under 35 U.S.C. 154(b) by 0 days.

(21) Appl. No.: 14/518,316

(22) Filed: Oct. 20, 2014

(65) Prior Publication Data
US 2015/0162948 A1  Jun. 11, 2015

Related U.S. Application Data

(60) Provisional application No. 61/913,994, filed on Dec. 10, 2013.

(51) Int. Cl.
| | |
|---|---|
| *H04M 1/00* | (2006.01) |
| *H04B 1/3888* | (2015.01) |
| *H04M 1/04* | (2006.01) |
| *H04M 1/03* | (2006.01) |
| *H04M 1/18* | (2006.01) |

(52) U.S. Cl.
CPC .......... *H04B 1/3888* (2013.01); *H04M 1/035* (2013.01); *H04M 1/04* (2013.01); *H04M 1/185* (2013.01)

(58) Field of Classification Search
None
See application file for complete search history.

(56) References Cited

U.S. PATENT DOCUMENTS

| | | | |
|---|---|---|---|
| 6,006,969 A | 12/1999 | Kim | |
| 6,081,695 A | 6/2000 | Wallace | |
| D441,713 S * | 5/2001 | Gartrell | D13/108 |
| 6,752,299 B2 * | 6/2004 | Shetler | A45F 5/02 |
| | | | 224/197 |
| 6,880,737 B2 | 4/2005 | Bauer | |
| 2005/0161352 A1 * | 7/2005 | Huddleston | A45C 11/00 |
| | | | 206/320 |
| 2007/0205244 A1 | 9/2007 | Hewes | |
| 2008/0096620 A1 * | 4/2008 | Lee | G06F 1/1626 |
| | | | 455/575.8 |
| 2011/0000945 A1 | 1/2011 | Mongan | |
| 2011/0309728 A1 * | 12/2011 | Diebel | H04B 1/3888 |
| | | | 312/293.1 |

* cited by examiner

*Primary Examiner* — Moustapha Diaby
(74) *Attorney, Agent, or Firm* — Global Intellectual Property Agency, LLC; Daniel Boudwin

(57) ABSTRACT

An electronic device cover is provided having an elongated first surface, a first and second sidewall surface, and a first and second inward lip member forming a sleeve-like configuration to accept a handheld electronic device therein. The first end of the cover comprises an inwardly flaring surface adapted to prevent an electronic device from sliding therethrough. The second end of the cover comprises an outwardly flaring surface adapted to facilitate insertion of an electronic device therethrough. The device is adapted to be sized such that the first surface and sidewall surfaces are coextensive with a rectangular smartphone or tablet device. The inward lip members extend partially over the outer surface of the electronic device to retain the same within the cover interior volume. Overall, the cover dissipates impact energy and improves acoustics of the electronic device when secured thereto.

7 Claims, 2 Drawing Sheets

ELECTRONIC DEVICE COVER

CROSS REFERENCE TO RELATED APPLICATION

This application claims the benefit of U.S. Provisional Application No. 61/913,994 filed on Dec. 10, 2013, entitled "Screen Guard." The above identified patent application is herein incorporated by reference in its entirety to provide continuity of disclosure.

BACKGROUND OF THE INVENTION

Field of the Invention

The present invention relates to electronic device protective cases and to supports therefor. More specifically, the present invention relates to an electronic device case that slides onto a tablet or smartphone, whereby the frontside or backside is protected and the sides are used to secure the sleeve thereto.

Handheld electronic devices such as tablets and smartphones are all-but necessary appliances for everyday living and for business purposes. These devices store important data and provide vital connectivity. Most maintain important personal information, user contacts, and other data that assist with productivity, connectivity, or for general usage (i.e. gaming, navigation, internet access, etc.). Handheld electronic devices provide rapid access to information and the ability to reach others with the press of a dial. As a result, these devices are ingrained into our society and have rapidly become a necessary personal item while at home or while away.

Common problems associated with these devices are their fragility and cost. Most smartphones are quite sophisticated and therefore are an expensive piece of equipment. Protecting the investment made to acquire the device is a common need. It is not uncommon for a user to drop a smartphone or tablet during routine use, which can lead to damage and potential interference with its continued use. To prevent damage, many users employ a protective case along the outside of the electronic device to absorb impacts and prevent screen or chassis damage.

The present invention relates to a slidable smartphone or tablet cover that secures around the sides and one face of the electronic device. The cover prevents damage to the device and furthermore facilitates storage while connected to the device and while the device is in use. The cover comprises an elongated member having a first surface, a pair of upstanding sidewalls, and a pair of inward lips extending from the sidewalls. This forms a partial enclosure, whereby the first surface covers the screen or backside of an electronic device while the sidewalls and inward lips secure the cover around the sides thereof. Along the first and second ends of the cover are flared surfaces, whereby one end flares outward to facilitate insertion of the electronic device, while the opposite end flares inward to prevent the electronic device from sliding out of the cover through that end. Overall the assembly prevents screen or chassis damage by absorbing impacts along the first surface, sidewalls or inward lip of its design.

Description of the Prior Art

Devices have been disclosed in the prior art that relate to protective devices for handheld electronic devices. These include devices that have been patented and published in patent application publications. The following is a list of devices deemed most relevant to the present disclosure, which are herein described for the purposes of highlighting and differentiating the unique aspects of the present invention, and further highlighting the drawbacks existing in the prior art.

One such device in the prior art is U.S. Patent Publication No. 2011/0000945 to Mongan, which discloses an electronic device holder that is adapted to cradle the electronic device and support the device from a wearer's person. Several embodiments are disclosed, including an arrangement that includes a back side to support the electronic device with tabs that secure the electronic device to the backside. Further provided are articulating embodiments. However, none of the Mongan devices contemplate a slidable screen cover as disclosed herein.

Another device is U.S. Pat. No. 6,006,969 to Kim, which discloses a belt holder for a portable electronic device that includes a guide channel, a clip plate, and a locker for removably securing an electronic device into the belt holder and securing the assembly to a wearer's belt. The Kim device secures a phone or similar article in a case that is supported along the belt of a user. The present invention contemplates a slidable screen cover for a substantially flat electronic device, such as a smartphone or tablet device. The screen cover secures over the side edges of the assembly and the surface of the cover shrouds the touchscreen of the device to prevent damage thereto.

U.S. Patent Publication No. 2007/0205244 to Hewes, Jr. discloses another holster for an electronic device that is formed from a tee shaped article of leather, whereby the assembly forms over an electronic device and secures to itself with a fastener. The holster secures over a phone or similar electronic device and allows the assembly to be worn on the belt of the user. Similar to the aforementioned devices, the Hewes, Jr. device fails to contemplate a slidable screen cover that is substantially rigid in construction and secures over the sides of a smartphone or tablet screen.

Similar to the Hewes, Jr. device is U.S. Pat. No. 6,880,737 to Bauer, which discloses a holder for electronic devices that comprises a strap with an optional pouch, wherein the strap includes a pair of apertures for supporting an electronic device holster clips. The strap secures the electronic device within the clips of holster and permits the angular positioning of the holster without regard to vertical, whereby the strap secures the device therein and prevents it from sliding therefrom. While the Bauer device may be used to secure over an electronic device, it fails to contemplate a hardened sleeve that secures around the sides and over the touchscreen of a like-equipped electronic device.

The present invention provides a protective cover that slidably engages a rectangular smartphone, tablet, or similar electronic device for the purposes of preventing damage thereto when dropped or mishandled. The cover comprises an elongated assembly with a U-shaped cross section and flared ends. It is submitted that the present invention substantially diverges in design elements from the prior art and provides a simple construction that fulfills a need in the art for electronic device protective cases.

SUMMARY OF THE INVENTION

In view of the foregoing disadvantages inherent in the known types of handheld electronic device cases now present in the prior art, the present invention provides a new protective case that can be utilized for providing convenience for the user when protecting a handheld electronic device from damage as a result of mishandling and other impact event.

It is therefore an object of the present invention to provide a new and improved handheld electronic cover that has all of the advantages of the prior art and none of the disadvantages.

It is another object of the present invention to provide a handheld electronic cover that protects the screen and the chassis of the electronic device, providing impact energy dissipation throughout the rigid shell thereof to prevent damage of internal components of the device.

Another object of the present invention is to provide a handheld electronic cover that is readily and easily applied and removed from the electronic device.

Yet another object of the present invention is to provide a handheld electronic cover that can be used to cover the screen or the backside of the electronic device, and furthermore one that can remain attached to the electronic device while the screen is in use.

Another object of the present invention is to provide a handheld electronic cover that is adapted to slidably receive a rectangular electronic device such as a smartphone or tablet.

Another object of the present invention is to provide a handheld electronic cover that includes flared ends, whereby a first end is adapted to facilitate slidable engagement of the electronic device while the second end is adapted to retain the device within the cover.

Another object of the present invention is to provide a handheld electronic cover that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
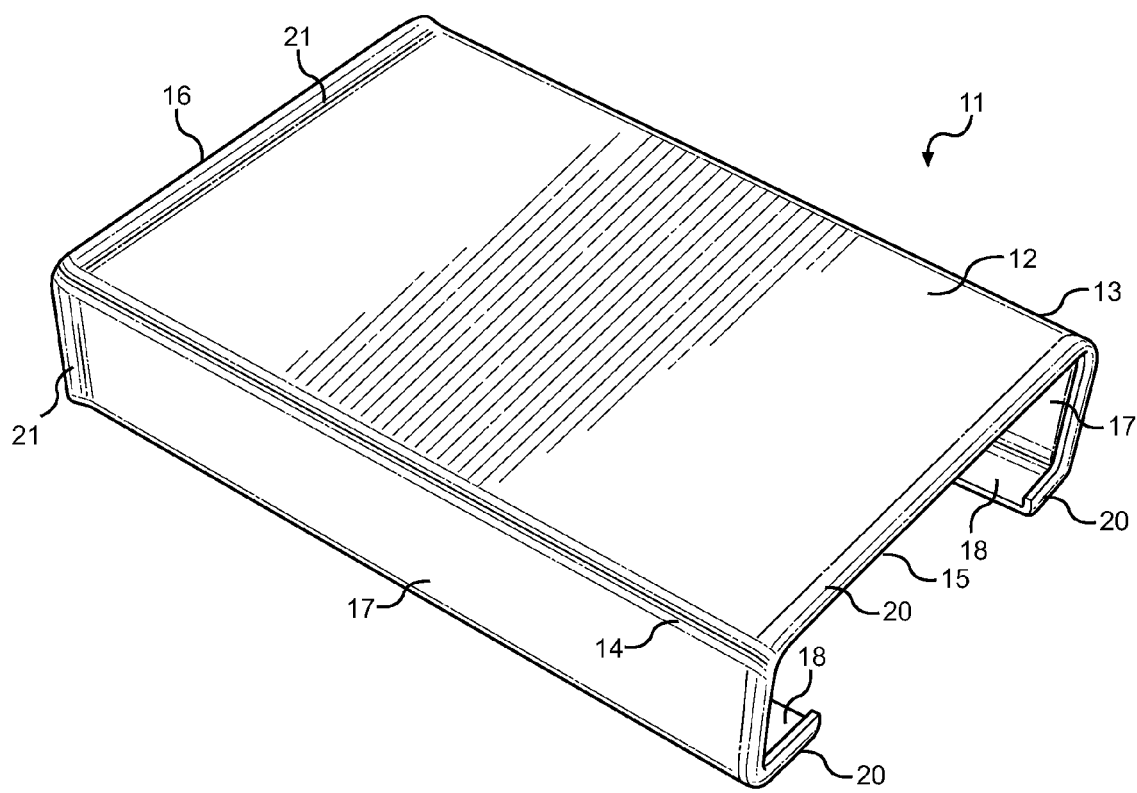
FIG. 1 shows a perspective view of the present invention.

Reference is made herein to the attached drawings. Like reference numerals are used throughout the drawings to depict like or similar elements of the handheld electronic cover of the present invention. For the purposes of presenting a brief and clear description of the present invention, the preferred embodiment will be discussed as used for covering the screen or backside of a rectangular smartphone or tablet to protect the electronic device while stowed and while in use. The figures are intended for representative purposes only and should not be considered to be limiting in any respect.

Figure 2:
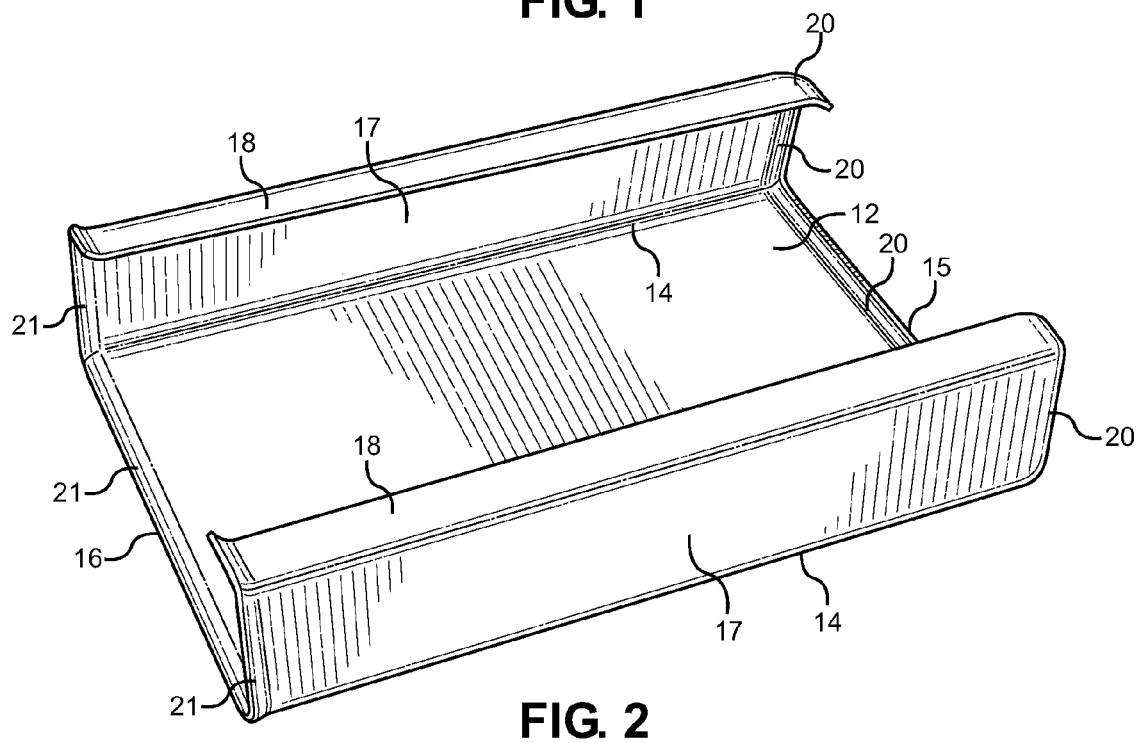
FIG. 2 shows another perspective view of the present invention.

Referring now to FIGS. 1 and 2, there are shown two perspective views of the handheld electronic cover 11 of the present invention. The cover 11 is one that is adapted to slidably engage a rectangularly smartphone, tablet, or similar electronic device and protect the screen and chassis thereof. The cover 11 forms a sleeve within which the electronic device is positioned, wherein the structure of the cover absorbs impacts and spreads load along its shell rather than allow the electronic device to directly dissipate the impact energy from a fall or from knocking into other objects.

The cover 11 is a unitary, formed structure comprising an elongated member that is coextensive with one major surface and two side edges of an electronic device. Specifically, the cover 11 comprises an elongated first surface 12 having a first end 15, a second end 16, and a first and second side edge 14. The first surface 12 is substantially planar and comprises a thickness, whereby the first surface 12 is utilized to cover the backside surface or screen portion of the electronic device. Extending substantially perpendicularly from the first surface and from the first and second side edges 14 are a first and second sidewall surface 17. The sidewall surfaces 17 are adapted to form over the sides of the electronic device and sandwich the device therebetween. Extending inward from the sidewall surfaces 17 is an inward lip member 18, which forms over a portion of the electronic device's second major surface to enclose the device within the interior of the cover 11. The inward lip members 18 are substantially parallel to the first surface 12 and substantially perpendicular from the sidewall surfaces, and finally extend inward towards one another.

Along the first end 15 and second end 16 are flared sections that facilitate opposite operations. The first end 15 comprises an inwardly flaring surface 20, wherein the opening between the first surface 12, sidewall surfaces 17, and the inward lip members 18 is reduces to prevent an electronic device from sliding through the first end 15. The reduced cross section at this area allows the electronic device to be retained within the interior of the cover without fear of sliding through the first end 15.

Conversely, the second end 16 of the cover comprises an outwardly flaring surface 21. The outwardly flaring surface 21, as with the inwardly flaring surface 20, is formed along the first surface 12, sidewall surfaces 17, and inward lip members 18 of the second end 16. The outwardly flaring surface 21 is a surface that flares away from the interior portion of the cover and facilitates ease of entry of an electronic device through this end 16. By flaring the surface outward, the cross section of the outer extent of the second end 16 is wider; therefore the clearance between the second end 16 and an electronic device being inserted therethrough is greater than along the mid-portion of the cover 11.

Figure 3:
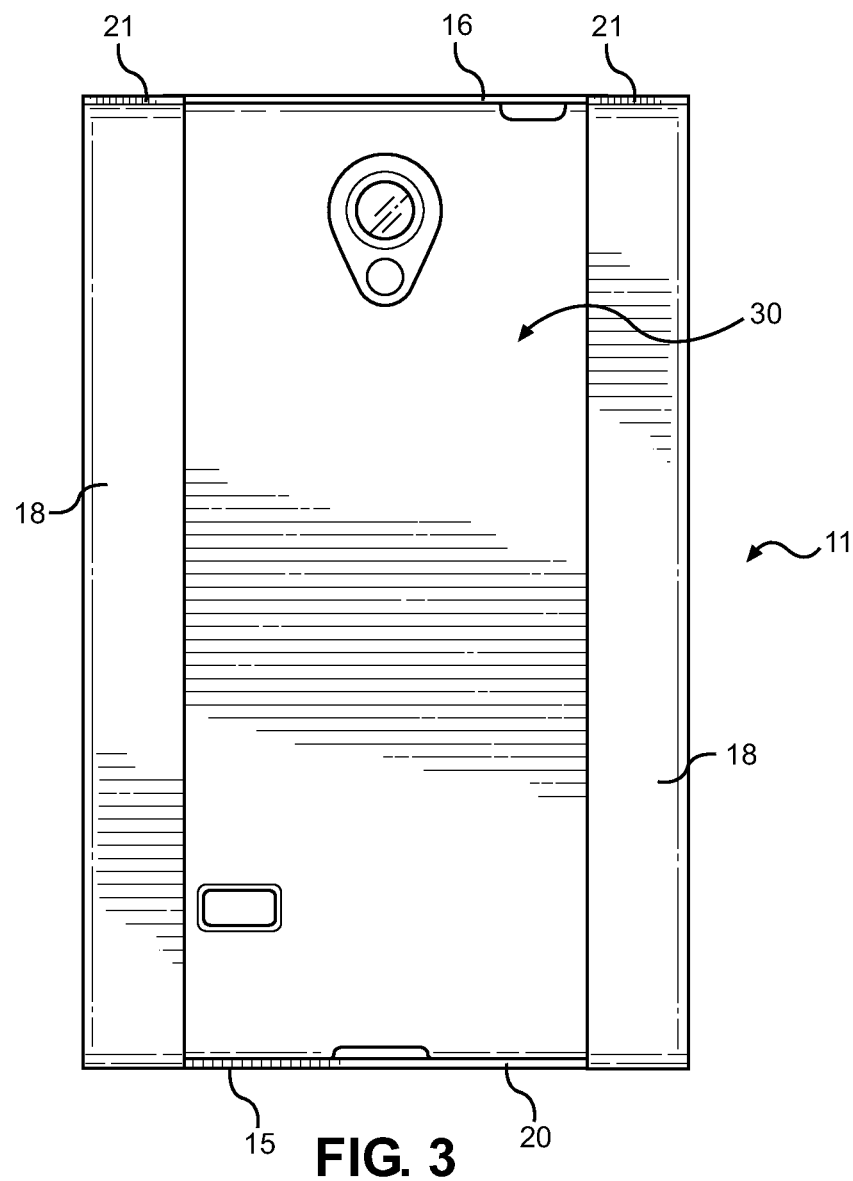
FIG. 3 shows a rear view of the present invention engaged with a handheld electronic device.

Referring now to FIG. 3, there is shown a view of the electronic device cover 11 in a working state, supporting an electronic device 30 within its open interior. The cover 11 forms a sleeve having an interior volume between the first surface, sidewall surfaces, and the inward lip members 18. The surface opposite the first surface and between the inward lip members 18 is open, thereby allowing the screen or backside surface of the electronic device 30 to be viewable and accessible when the cover is donned. The cover 11 can be mounted such that the first surface covers the touchscreen (as shown in FIG. 3), or alternatively so the cover 11 secures over the backside surface of the electronic device 30. The inward lip members 18 form inward from the sidewalls of the cover 11 and cover a small portion of the electronic device 30 along its side edges. The extent of the coverage is preferably minimal, whereby the surface area of the inward lip members 18 is adapted to be sufficient to retain the electronic device 30 within the cover interior, while also minimizing its coverage over usable areas of the device touchscreen.

The cover forms a sleeve or tubular member with a hollow interior and an open upper, wherein the screen or backside of the electronic device is visible and exposed through the open upper. The first 15 and second 16 ends of the device are similarly open, wherein the opposing ends have oppositely flaring surfaces 20, 21 to facilitate opposite operates (device containment/ease of entry). The desired material for the cover 11 is one of sufficiently rigid, stiff material that will not yield to an abrupt impact and will spread load across its surfaces. The cover 11 therefore operates similar to the outer shell of a helmet, spreading the load across a broad surface while also preventing puncture from pointed or edge contacts. Contemplated materials may include, inter alia, thin-sheet aluminum, plastic material, and other similar materials that have a high stiffness and failure point such that the cover will not overly deform or shatter easily upon impact.

Figure 4:
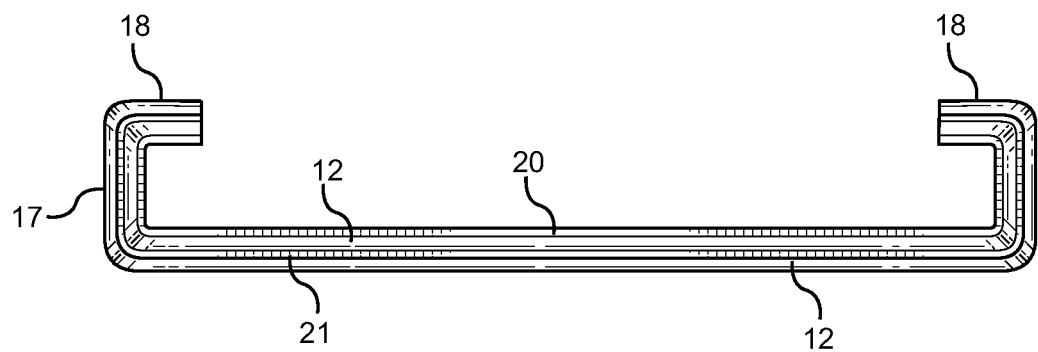
FIG. 4 shows an end view of the present invention.

Referring finally to FIG. 4, there is shown an end view of the cover. As shown, the second end 16 comprises an outwardly flaring surface 21 that facilitates the insertion of an electronic device through this end 16 of the cover. The outward flaring surface 21 preferably extends from one inward lip member 18 to another and along the entire extent of the second end 16. Along the first end 15 there is formed an inwardly flaring surface 20, which is adapted to perform the exact opposite operation as the opposite end. The inwardly flaring surface 20 narrows the cross section of the cover and thereby limits the ability of the electronic device to slide through that end. Therefore, the device is placed through the second end 16 of the cover and prevented from sliding completely through the cover by way of the inwardly flaring surface 20 of the first end 15. The clearance between the interior surfaces of the cover and the electronic device are intended to be minimal such that a close-fit tolerance is provided, therefore preventing any free sliding of the cover over the device when the user does not intend such action.

Electronic device screens and chasses are prone to breakage, especially if they are accidentally dropped on the ground or abruptly impacted by an object while being handled. This is especially problematic for individuals who perform manual labor and store their cell phone in their pocket. Unfortunately, if the touchscreen of an electronic device such as a smartphone or tablet is damaged, it can be virtually impossible to interact with the device. This makes it difficult to make inputs to the device when entering text, reading e-mail, accessing or taking pictures, or even making or receiving voice calls. The present invention discloses a new and novel electronic device cover for these needs.

The present invention acts as a protective case and sleeve holster. Along with providing physical coverage and protection, the cover may also provide improved acoustics with regard to a cell phone ringtone. The cover may be comprised of a metallic material that has a high stiffness, which resonates when the phone vibrates and emits sounds. The material accentuates the sound and vibration such that it can be more easily heard and felt, if placed in the pocket of a user. The size of the cover may take on different forms and be designed for specific phone and tablet models, whereby the dimensions are so as to provide a close-tolerance fit around the exterior of the electronic device to prevent free sliding of the cover.

Overall, the present invention provides a new and novel electronic device cover that is readily applied and retained, whereby the screen and chassis of the electronic device are protected while the cover is applied. It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electronic device cover, comprising:
   a first surface having a first end, a second end, a first side edge, and a second side edge;
   a first sidewall surface and a second sidewall surface;
   said first sidewall surface extending from said first side edge and perpendicularly from said first surface;
   said second sidewall surface extending from said second side edge and perpendicularly from said first surface;
   an inward lip member extending inwardly from an upper end of each of said first sidewall surface and said second sidewall surface;
   said inward lip members being parallel to said first surface;
   an interior volume between said first surface, first sidewall surface and said second sidewall surface, said inward lip members, and said first end and said second end;
   an outwardly flaring surface disposed on the second end, the outwardly flaring surface extending from said first sidewall, said second sidewall and said second end, such that it extends outwardly away from the interior volume;
   wherein the outwardly flaring surface defines an opening for providing access to the interior volume, the opening configured to slidably receive an electronic device therethrough;
   an inwardly flaring surface disposed on the first end, the inwardly flaring surface extending from said first sidewall, said second sidewall and said first end, such that it extends inwardly towards the interior volume;
   wherein the inwardly flaring surface is configured to receive and retain an electronic device in the interior volume;
   wherein the inwardly flaring surface defines an opening having a width smaller than a width of the opening defined by the outwardly flaring surface.

2. The electronic device cover of claim 1, wherein said inwardly flaring surface extends along an extent of said first end.

3. The electronic device cover of claim 1, wherein said outwardly flaring surface extends along an extent of said second end.

4. The electronic device cover of claim 1, wherein said inwardly flaring surface extends along an extent of said first end, from one upstanding lip member to another and along said first sidewall surface, said second sidewall surface, and said first surface.

5. The electronic device cover of claim 1, wherein said outwardly flaring surface extends along an extent of said second end, from one upstanding lip member to another and along said first sidewall surface, said second sidewall surface, and said first surface.

6. The electronic device cover of claim 1, wherein the inwardly flaring surface comprises a uniform width.

7. The electronic device cover of claim 1, wherein the outwardly flaring surface comprises a uniform width.

* * * * *